United States Patent
Chen et al.

(10) Patent No.: US 8,311,060 B2
(45) Date of Patent: Nov. 13, 2012

(54) METHOD AND SYSTEM FOR TRANSMITTING IP MESSAGE, NEGOTIATING BANDWIDTH SAVING CAPABILITY AND SAVING NETWORK BANDWIDTH

(75) Inventors: Cheng Chen, Shenzhen (CN); Jiangping Feng, Shenzhen (CN); Peng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 12/235,876

(22) Filed: Sep. 23, 2008

(65) Prior Publication Data
US 2009/0022065 A1    Jan. 22, 2009

Related U.S. Application Data

(63) Continuation of application No. PCT/CN2007/001414, filed on Apr. 27, 2007.

(30) Foreign Application Priority Data

Apr. 27, 2006   (CN) .......................... 2006 1 0076081

(51) Int. Cl.
*H04J 3/24* (2006.01)
(52) U.S. Cl. .......................... 370/473; 370/477; 709/247
(58) Field of Classification Search .................. None
See application file for complete search history.

(56) References Cited

U.S. PATENT DOCUMENTS

| | | | |
|---|---|---|---|
| 6,967,958 B2 * | 11/2005 | Ono et al. ...................... | 370/401 |
| 7,058,973 B1 * | 6/2006 | Sultan .............................. | 726/12 |
| 7,171,485 B2 * | 1/2007 | Roach et al. .................. | 709/232 |
| 7,274,711 B2 * | 9/2007 | Kajizaki et al. ............... | 370/473 |
| 7,394,807 B2 * | 7/2008 | Hamiti et al. ................. | 370/389 |
| 2004/0139088 A1 | 7/2004 | Mandato et al. | |
| 2005/0009530 A1 | 1/2005 | Rouffet et al. | |
| 2005/0265353 A1 | 12/2005 | Sengupta et al. | |
| 2007/0171829 A1 * | 7/2007 | Kojima ......................... | 370/235 |
| 2009/0022065 A1 | 1/2009 | Chen et al. | |

(Continued)

FOREIGN PATENT DOCUMENTS

CN    1578521    2/2005

(Continued)

OTHER PUBLICATIONS

3GPP TS 29.414 version 7.2.0 Release 7, Universal Mobile Telecommunications System (UMTS); Core network Nb data transport and transport signalling, Mar. 2007.*

(Continued)

*Primary Examiner* — Kwang B Yao
*Assistant Examiner* — Alex Skripnikov
(74) *Attorney, Agent, or Firm* — Huawei Technologies Co., Ltd.

(57) ABSTRACT

The present disclosure discloses a method for transmitting an IP message, negotiating a bandwidth saving capability and saving network bandwidth. The method for transmitting an IP message includes: sending more than one bandwidth saving capability supported by a sender to a receiver; receiving one bandwidth saving capability selected by the receiver; obtaining a type of an IP message for transmitting data according to the bandwidth saving capability selected by the receiver; and sending the IP message to the receiver after constructing the IP message, wherein the one bandwidth saving capability is selected from the more than one bandwidth saving capability and is supported by the receiver. By applying the methods provided by the present disclosure, the bandwidth and resources of an IP bearer network in a communication system are saved.

18 Claims, 9 Drawing Sheets

U.S. PATENT DOCUMENTS

2009/0219939 A1* 9/2009 Isosaari .................. 370/400

FOREIGN PATENT DOCUMENTS

| CN | 101047711 A | 10/2007 |
|---|---|---|
| CN | 101317404 B | 2/2012 |
| EP | 1111847 | 6/2001 |
| EP | 1248431 | 10/2002 |
| WO | WO-0215627 | 2/2002 |
| WO | WO-2005109791 | 11/2005 |

OTHER PUBLICATIONS

Supplementary European Search Report regarding Application No. 07720987.2/PCT/CN2007001414.

Compressing IP/UDP/RTP Headers for Low-Speed Serial Links, Feb. 1999.

Real-Time Services Over the Internet, Sep. 21, 1997.

SDP: Session Description Protocol, Apr. 1998.

Technical Specification Group Core Network, 3G TS 24.065 v3.1.0 (Aug. 1999).

International Search Report for International Application No. PCT/CN2007/001414, dated Jul. 10, 2007, with English translation.

Written Opinion of the International Searching Authority regarding Application No. PCT/CN2007/001414, mailed Aug. 2, 2007. English translation provided by Huawei Technologies Co., Ltd.

First Chinese Office Action regarding Application No. 200610076081.9, mailed Jan. 1, 2008. Partial English translation provided by Huawei Technologies Co., Ltd.

First Chinese Office Action regarding Application No. 200780000327.7, mailed Jul. 26, 2010. Partial English translation provided by Huawei Technologies Co., Ltd.

Second Chinese Office Action regarding Application No. 200610076081.9, mailed Oct. 30, 2009. Partial English translation provided by Huawei Technologies Co., Ltd.

International Telecommunication Union. Telecommunication Standardization Sector of ITU. Series H: Audiovisual and Multimedia Systems. Infrastructure of audiovisual services—Communication procedures. Gateway control protocol: Version 2. H.248.1 (May 2002).

International Telecommunication Union. Telecommunication Standardization Sector of ITU. Series Q: Switching and Signalling. Specifications of signalling related to Bearer Independent Call Control (BICC). BICC IP bearer control protocol. Q.1970 (Jul. 2001).

M. Handley and V. Jacobson. SDP: Session Description Protocol. Apr. 1998.

Schulzrinne et al. RTP: Transport Protocol for Real-Time Applications. Jul. 2003.

3GPP TSG-CT WG3 Meeting #39. Denver, USA, Feb. 13-17, 2006. RTP Multiplexing on Nb- and Iu-interface.

3GPP TSG-CT WG3 Meeting #39. Denver, USA, Feb. 13-17, 2006. Bandwidth savings for CS transport in an IP/MPLS core network.

3GPP TSG-CT WG3 Meeting #38. Berlin, Germany. Oct. 31-Nov. 4, 2005. Bandwidth savings multiplexing Nb Framing protocol for IP transport.

3GPP TS 29.415 V6.1.0 (Dec. 2004). 3rd Generation Partnership Project; Technical Specification Group Core Network; Core Network Nb Interface User Plane Protocols (Release 6).

3GPP TS 25.415 V6.2.0 (Mar. 2005). 3rd Generation Partnership Project; Technical Specification Group Radio Access Network; UTRAN Iu interface user plane protocols (Release 6).

Bormann et al. RObust Header Compression (ROHC): Framework and four profiles: RTP, UDP, ESP, and uncompressed. Jul. 2001.

Casner et al. Compressing IP/UDP/RTP Headers for Low-Speed Serial Links. Feb. 1999.

Koren et al. Enhanced Compressed RTP (CRTP) for Links with High Delay, Packet Loss and Reordering. Jul. 2003.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

Fig. 3 (Prior art)

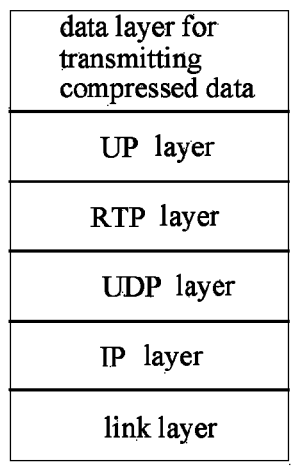

Fig. 4 (Prior art)

| Bits | | | | | | | | Number of Octets | |
|---|---|---|---|---|---|---|---|---|---|
| 7 | 6 | 5 | 4 | 3 | 2 | 1 | 0 | | |
| PDU Type (=0) | | | | Frame Number | | | | 1 | Frame Control Part |
| FQC | | | RFCI | | | | | 1 | |
| Header CRC | | | | | | Payload CRC | | 2 | Frame Check Sum Part |
| Payload CRC | | | | | | | | | |
| Payload Fields | | | | | | | | 0–n | Frame Payload part |
| Payload Fields | | | | Padding | | | | | |
| Spare extension | | | | | | | | 0-4 | |

Fig. 5a (Prior art)

| Bits | | | | | | | | Number of Octets | |
|---|---|---|---|---|---|---|---|---|---|
| 7 | 6 | 5 | 4 | 3 | 2 | 1 | 0 | | |
| PDU Type (=1) | | | | Frame Number | | | | 1 | Frame Control Part |
| FQC | | | RFCI | | | | | 1 | |
| Header CRC | | | | | | Spare | | 1 | Frame Check Sum Part |
| Payload Fields | | | | | | | | 0–n | Frame Payload part |
| Payload Fields | | | | Padding | | | | | |
| Spare extension | | | | | | | | 0-4 | |

Fig. 5b (Prior art)

| Bits | | | | | | | | Number of Octets | |
|---|---|---|---|---|---|---|---|---|---|
| 7 | 6 | 5 | 4 | 3 | 2 | 1 | 0 | | |
| PDU Type (=2) | | | | Frame Number | | | | 1 | Frame Control Part |
| FQC | | | RFCI | | | | | 1 | |
| Payload Fields | | | | | | | | 0-n | Frame Payload part |
| Payload Fields | | | | Padding | | | | | |
| Spare extension | | | | | | | | 0-4 | |

Fig. 14

| Bits | | | | | | | | Number of Octets | |
|---|---|---|---|---|---|---|---|---|---|
| 7 | 6 | 5 | 4 | 3 | 2 | 1 | 0 | | |
| Source IP, Dest IP, … | | | | | | | | 20/40 | IP |
| Source Port, Dest Port=1024, Length, … | | | | | | | | 8 | UDP |
| L | MUX ID= Dest port/2 | | | | | | | 2 | Multiplex Header |
| Length | | | | | | | | 1/2 | |
| SourceID | | | | | | | | 2 | |
| Version, P, M, X, … | | | | | | | | 12 | RTP |
| Payload Payload | | | | | | | | n | Payload |
| Multiplex Header | | | | | | | | 4/5 | MP |
| Version, P, M, X, … | | | | | | | | 12 | RTP |
| Payload | | | | | | | | n | Payload |

Fig. 15

| Bits | | | | | | | | Number of Octets | |
|---|---|---|---|---|---|---|---|---|---|
| 7 | 6 | 5 | 4 | 3 | 2 | 1 | 0 | | |
| Source IP, Dest IP, ... | | | | | | | | 20/40 | IP |
| Source Port, Dest Port=1024, Length, ... | | | | | | | | 8 | UDP |
| L | Mux ID= Dest Port/2 | | | | | | | 2 | Multiplex Header |
| Length | | | | | | | | 1/2 | |
| P | SourceID | | | | | | | 2 | |
| M | Payload Type | | | | | | | 1 | |
| Sequence Number | | | | | | | | 1 | |
| Time Stamp | | | | | | | | 2 | |
| Payload | | | | | | | | n | Payload |
| Multiplex Header | | | | | | | | 9/10 | Multiplex Header |
| Payload | | | | | | | | n | Payload |

US 8,311,060 B2

METHOD AND SYSTEM FOR TRANSMITTING IP MESSAGE, NEGOTIATING BANDWIDTH SAVING CAPABILITY AND SAVING NETWORK BANDWIDTH

CROSS-REFERENCE TO RELATED APPLICATIONS

This application is a continuation of International Application No. PCT/CN2007/001414, filed Apr. 27, 2007. This application claims the benefit and priority of Chinese Patent Application No. 200610076081.9, filed Apr. 27, 2006. The entire disclosures of each of the above applications are incorporated herein by reference.

FIELD

The present disclosure relates to data transmission technologies in an Internet Protocol (IP) bearer network of a communication system, and more particularly, to methods and systems for transmitting an IP message, negotiating a bandwidth saving capability and saving network bandwidth.

BACKGROUND

This section provides background information related to the present disclosure which is not necessarily prior art.

In a communication system, such as an IP bearer network of a Wide Code Division Multiple Access (WCDMA) system, data is transmitted through being carried in a message, such as an IP message. FIG. 1 is a schematic diagram illustrating the structure of a conventional WCDMA network. In the figure, the broken lines indicate signaling paths, and the solid lines indicate message transmission paths for bearing data. The data to be transmitted via an Nb interface between Media Gateways (MGWs) and the data to be transmitted via an Iu interface between a Universal Terrestrial Radio Access Network (UTRAN) and a Media Gate Way (MGW) can be carried by IP messages. User plane parameters can be negotiated by a User Plane (UP) Protocol on the Nb interface and Iu interface. A Mobile Service Control center server (MSC server) controls the MGW by the H.248 protocol via a Mc interface. The above-mentioned network structure may also be used in a fixed softswitch system, a CDMA system, an IP Multimedia Subsystem (IMS) of a fixed network or the like.

For the purpose of bearing data in an IP message, a protocol stack bearing the IP message, as shown in FIG. 2, is constructed. The protocol stack includes a data layer for transmitting data, a Real-Time Transport Protocol (RTP) layer, a User Datagram Protocol (UDP) layer, an IP layer and a link layer. The IP layer may be based on two versions including IP version 4 (IPv4) or IP version 6 (IPv6). The link layer is used for performing a cyclic redundancy check (CRC) on the IP message by an ETHER protocol and a Packet Over SDH/SONET (POS). Detailed descriptions for the RTP layer and the UDP layer are as follows.

The UDP layer is a simple data-oriented transmission protocol layer. On the UDP layer, data transmission channels are reserved respectively for different sessions according to port numbers. A sender sends UDP data via a source port of a data transmission channel, and a receiver receives data via a destination port of the data transmission channel. The UDP layer does not provide reliability, i.e., the sender sends the UDP data, but does not ensure that the UDP data can reach the receiver.

The RTP layer is a protocol layer for providing end-to-end transmission services for data of real time characteristics, such as interactive voice data or image data. The RTP layer is defined to work in one-to-one or one-to-multiple transmission to provide time synchronization and data stream synchronization. The RTP layer usually transmits the data via the UDP layer, and one RTP data packet can be transmitted via two parts, one of which is based on RTP, and the other of which is based on Real-Time Transport Control Protocol (RTCP). The RTP layer is unable to provide a reliable transmission mechanism for the RTP data packets being transmitted in sequence and is unable to provide flow control and congestion control. These services are provided by the RTCP. Sequence numbers in the IP messages may be used by the receiver to reconstruct a sequence of the IP messages sent by the sender and can be used to determine the location of one IP message in the entire sequence of the IP messages sent by the sender. Timestamps in the IP messages may be used to calculate delay and jitter of the network transmission.

FIG. 3 is a schematic diagram illustrating the structure of an RTP header of an IP message. The figure shows the format and contents of the RTP header, and usages of the fields in the RTP header are described as follows. The field of Version (V) is used to indicate version 2. The field of Padding (P) is configured as valid when the IP message has an additional padding byte. The field of eXtension (X) is used to indicate one extended header next to the RTP header (not being used at present). The field of a Contributor count (CC) is used to indicate the number of contributing source identifiers in the IP message with a maximum number of 15. The field of Marker (M), the meaning of which is specified by a session, is used for establishing borders between different data in the IP message. The field of a Payload type (PT) is used to indicate a service type of the data in the IP message. The field of Sequence Number (SN) is used to indicate a 16-bit sequence number of the IP message. The field of a timestamp is used to indicate a 16-bit sampling instant of the first byte of data in the IP message. The field of a Synchronization Source Identifier (SSRC) is used to indicate a synchronous source of the IP message. The field of a Contributing Source (CSRC) list is used to indicate all the contributor sources contained in the payload of the IP message and the number of which is given by the CC.

The data borne in the IP message usually needs to be compressed. When the IP message bearing the compressed data is transmitted via the Iu interface and Nb interface, an UP header needs to be capsulated for the compressed data. FIG. 4 is a schematic diagram illustrating the structure of an IP message bearing the data compressed by an Adaptive Multi Rate (AMR) protocol. The structure is almost the same as that illustrated in FIG. 2 except that an UP layer is added and the data is compressed by the AMR.

UP data messages of the UP layer include control messages and data messages, and the control messages include Initialization messages, rate control messages, time alignment messages and error event messages. There are two types of UP data message: a PDU Type 0 and a PDU Type 1 as shown respectively in FIGS. 5a and 5b.

In FIGS. 5a and 5b, the UP data message of the UP layer includes a control part, a check part and a payload part. As shown on the check part, CRC checks are performed on both the UP headers of the compressed data and the compressed data if the type of the UP data message is the PDU Type 0, and the CRC checks are performed only on the UP header of the compressed data if the type of the UP data message is the PDU Type 1.

The process for transmitting the IP message bearing data includes two parts: Part I a bandwidth saving capability of the IP message being negotiated; and Part II, the IP message being transmitted. Detailed descriptions of the two parts are given below.

Part I: The bandwidth saving capability of the IP message being negotiated.

Before the IP message is transmitted, one party of a sender and a receiver of the IP message needs to determine the type of the IP message to be transmitted by the other party or the desired type of the IP message supported by the other party, so that a process for negotiating the bandwidth saving capability is needed. Since each bandwidth saving capability corresponds to one type of the IP message, after the bandwidth saving capability is negotiated, the type of the IP message to be transmitted can be determined by the two parties. A conventional process for negotiating the bandwidth saving capability is described as follows. An initiator of the IP message sends a bandwidth saving capability supported by the initiator to a receiver of the IP message; the receiver determines whether the bandwidth saving capability from the initiator is supported by the receiver; if the bandwidth saving capability is supported by the receiver, the receiver sends to the initiator a reply message of a successful negotiation, indicating a successful negotiation; otherwise, the receiver sends a reply message of an unsuccessful negotiation, indicating that the negotiation fails or another negotiation can be initiated.

However, the process for negotiating the bandwidth saving capability of the IP message has following drawbacks, the sender of the IP message only sends one self-supported bandwidth saving capability to the receiver. Therefore, an unsuccessful negotiation or a re-negotiation occurs frequently, leading to a waste of resources in the communication system. For example, two bandwidth saving capabilities of the IP message supported by the sender are indicated as 0 and 1, only the bandwidth saving capability indicated as 0 can be sent to the receiver, while the bandwidth saving capability supported by the receiver is indicated as 1. Therefore, an unsuccessful negotiation or a re-negotiation occurs. Further, in the process for negotiating the bandwidth saving capability of the IP message, there is no definition on how to use the H.248 protocol to negotiate the bandwidth saving capability of the IP message, such as how to negotiate the bandwidth saving capability of the IP message in the case of Non-Tunnel in a circuit-switched core network of a WCDMA system.

Part II: The IP message being transmitted.

When the negotiation for the bandwidth saving capability of the IP message is finished, the type of the IP message used for transmitting data is determined according to the negotiated bandwidth saving capability, so that the data is transmitted via the IP message with the determined type.

At present, there are multiple types of the IP message, and two types commonly used currently are described below.

FIG. 3 shows the structure of a first type of the IP message which includes a compressed IP message header and compressed data, i.e., payload. For the purpose of saving communication system resources taken by the IP message header, the Internet Engineering Task Force (IETF) provides multiple standards of IP message header compression for compressing an IP message header of a session, i.e., compressing an IP header, a UDP header and an RTP header. In the process of the session, a lot of information in the IP message header does not change or changes a little; some information in the IP message header changes, but the difference between the information in two adjacent IP messages is invariable. The above-mentioned two types of information are referred to as stable information. At the beginning of the session, a sender sends to a receiver the IP message which carries the IP message header having the stable information, and then the sender only sends to the receiver the IP message which carries the IP message header having variable information. If the stable information changes in the process of the session, the sender resends to the receiver the IP message which carries the IP message header having the changed stable information. The receiver rearranges the IP message header of each received IP message in the session according to the received stable information and the variable information.

The data transmission by using the IP message with the above-mentioned type of the IP message has the following drawbacks. First, if the IP message which carries the IP message header having the stable information is lost or damaged, the receiver can not correctly update the IP message header of the IP message in the session. Therefore, two parties in the session can not correctly communicate with each other, and thus a mechanism must be provided for detecting whether the receiver has received the IP message header having the stable information, so that the receiver may send a message for requesting the sender to resend the IP message when failing to receive the IP message, but the transmission efficiency of the IP message is affected for it takes time for the messages to be sent and returned in the communication system. Second, the data transmission is suitable for only one session and can not be multiplied by multiple sessions. Third, since the IP message header of the IP message is compressed, the IP message having the compressed IP message header can not pass through routers not supporting the compressed IP message header.

FIG. 6 shows the structure of a second type of the IP message. A multiplex header technique and a RTP compression technique are used for the IP message with the second type of the IP message, i.e., a multiplex header is added to each IP sub-message, and a compression technique is used in the RTP layer. In the multiplex header technique, multiple IP sub-messages in multiple sessions which are identical in the source IP address and destination IP address are multiplied in one IP message, and the link layer, the IP layer and the UDP layer of each IP sub-message are unchanged in formats, and then the multiplied IP message is sent out. In the IP message including multiple IP sub-messages, the destination port number in the UDP header is a fixed value, and the source port number in the UDP header is meaningless. Each IP sub-message includes a multiplex header which indicates the destination UDP port number and message length of the IP sub-message. The RTP compression technique used in the IP sub-message minimizes the RTP layer length by shortening or erasing some fields in the RTP layer. In the RTP layer, the length of some fields can be minimized, such as a timestamp and a sequence number; some fields are unnecessary in some communication system networking environment, such as a P, an M, a CC, an X, a CSRC field and the like are useless in the WCDMA system network and may be removed. The RTP header is compressed after the fields in the RTP header is erased or shortened.

However, the data transmission by using the IP message with the above-mentioned type of the IP message has the following drawbacks.

First, when the multiplex technique is used in the IP message, since no information of the sender is carried in the multiplex header of each IP sub-message, the receiver which receives the IP message can not determine the validity of each IP sub-message in the IP message, and thus reliability and safety concerns may arise. For example, as shown in FIG. 7, firstly, a bidirectional connection is established between Terminal 1 with an IP address of 10.110.100.100 and a port number of 5000 and Terminal 2 with an IP address of 10.110.200.200 and a port number of 6000; and the two Terminals may transmit IP messages to each other. Secondly, after the message transmission is finished, the two Terminals need to be subtracted, and Terminal 1 is successfully subtracted, but Terminal 2 fails to be subtracted for some reasons and becomes a hanging terminal. Thirdly, the IP address and the port number of Terminal 1 is assigned to a subsequent terminal; if the IP address and the port number are assigned to Terminal 3, and a bidirectional connection is established between Terminal 3 and Terminal 4 with an IP address of 10.110.200.200 and a port number of 5000; Terminal 3 and Terminal 4 transmit IP messages to each other. However, the hanging Terminal 2 still sends the IP message to a terminal with the IP address of 10.110.100.100 and the port number of 5000, thus Terminal 3 receives the IP messages from two terminals, and the IP message from 10.110.200.200/5000 is legal, the IP message from 10.110.200.200/6000 is illegal and needs to be discarded. If the IP sub-message of the sent IP message does not include source information, the receiver is unable to determine the validity of the IP sub-message in the IP message; if no determination is made and all the IP sub-messages are taken as legal, the conversation quality will be affected, for example, a crosstalk may occur.

Second, when the multiplex technique is used in each IP sub-message in the IP message, the field for indicating the IP sub-message is so short that the length of the IP sub-message is indicated by at most one byte, and the indicated length is at most 255 bytes. Thus when the IP sub-message is long, the length of the IP sub-message can not be indicated, such as when video data is transmitted or an RTP redundant processing is given to the voice data, the payload length in the IP sub-message may be greater than 255 bytes, and in this way, the multiplex header technique can not be used.

Third, when the UP header is adopted in each IP sub-message of the IP message, no matter which one in the two types of the IP message is adopted, a CRC check needs to be performed on the UP header. However, the CRC check has already been performed on the IP message in the link layer of the IP message, and the correctness of the transmitted data is ensured. Therefore, if the CRC check is still performed on the UP header, the network bandwidth of the communication system is wasted and the requirement for equipment processing capacity is increased.

SUMMARY

This section provides a general summary of the disclosure, and is not a comprehensive disclosure of its full scope or all of its features.

Various Embodiments of the present disclosure provide a method and a system for transmitting an IP message to solve problems of frequent failures in bandwidth saving capability negotiations or frequent re-negotiations.

The various embodiments also provide a method and a system for negotiating a bandwidth saving capability to solve problems of frequent failures in bandwidth saving capability negotiations or frequent re-negotiations.

The various embodiments also provide a method for ensuring reliability of message transmission to ensure reliability and safety of transmitted messages.

The various embodiments also provide a method for saving network bandwidth to save network bandwidth and resources of an IP bearer network in a communication system.

According to the above, technical solutions of the various embodiments are achieved as follows A method for transmitting IP message includes:

sending more than one bandwidth saving capability supported by a sender to a receiver;

receiving one bandwidth saving capability selected by the receiver, obtaining a type of an Internet Protocol, IP, message for transmitting data according to the bandwidth saving capability selected by the receiver; and sending the IP message to the receiver after constructing the IP message;

wherein the one bandwidth saving capability is selected from the more than one bandwidth saving capability and is supported by the receiver.

A method for negotiating a bandwidth saving capability includes:

sending more than one bandwidth saving capability supported by a sender to a receiver;

receiving one bandwidth saving capability selected by the receiver, wherein the one bandwidth saving capability is selected from the more than one bandwidth saving capability and is supported by the receiver; and obtaining the bandwidth saving capability according to the bandwidth saving capability selected by the receiver.

A method for ensuring reliability of message transmission includes:

loading data in an IP message; and sending the IP message to a receiver;

wherein the IP message comprises at least one IP sub-message which comprises a multiplex header, wherein the multiplex header comprises a source ID for indicating information of a sender and a first indication for indicating length of the IP sub-message.

A method for saving network bandwidth includes:

loading data to be transmitted in an IP message; wherein the IP message being an UP data message comprises an UP data message comprising an UP header and data to be transmitted, the UP header and the data to be transmitted are compressed without CRC check; and sending the IP message to a receiver.

A system for transmitting IP message includes:

a sender, wherein the sender is configured to communicate with a receiver, wherein the sender is configured to send to a receiver more than one bandwidth saving capability supported by the sender, obtain the type of an IP message used for transmitting data according to one bandwidth saving capability received from the receiver, and send an IP message of the obtained type to the receiver after constructing the IP message; and wherein, the receiver is configured to select the bandwidth saving capability from the more than one bandwidth saving capability, the bandwidth saving capability being supported by the receiver.

A system for negotiating a bandwidth saving capability includes:

a sender, wherein the sender is configured to communicate with a receiver, wherein the sender is configured to send to a receiver more than one bandwidth saving capability supported the sender; and obtain a bandwidth saving capability used for transmitting data according to a first bandwidth saving capability received from the receiver; and the receiver, configured to select the first bandwidth saving capability from the more than one bandwidth saving capability, wherein the first bandwidth saving capability is supported by the receiver; and send the first bandwidth saving capability to the sender.

A sender apparatus includes:

means for sending to a receiver more than one bandwidth saving capability supported by the sender apparatus, receiving one bandwidth saving capability from the receiver;

means for obtaining the type of the IP message according to the bandwidth saving capability received from the receiver; and means for sending an Internet Protocol, IP, message of the obtained type to the receiver after constructing the IP message.

A receiver apparatus includes:

means for receiving more than one bandwidth saving capability supported by a sender from the sender;

means for selecting one bandwidth saving capability from the more than one bandwidth saving capability, wherein the one bandwidth saving capability is supported by the receiver apparatus, and send the one bandwidth saving capability to the sender.

It can be seen from the above solutions that in the methods and systems provided by the various embodiments, two parts of the process for transmitting the IP message, i.e., the part of negotiating a bandwidth saving capability and the format taken by the IP message bearing data, are reformed respectively. In the various embodiments, of the process for negotiating the bandwidth saving capability, the bandwidth saving capability borne by an UP initializaion message is extended or an SDP is used for bearing the bandwidth saving capability, and thus multiple bandwidth saving capabilities can be borne, while in the prior art only one bandwidth saving capability can be borne in each negotiation process; thus, not only the problems of frequence failures in bandwidth saving capability negotiations or frequent re-negotiations is solved, but also such problem that only the UP is used for negotiating the bandwidth saving capability is solved. The multiplex header technique and the RTP compression technique are still used in the IP message format taken by the various embodiments; a source ID is added to the multiplex header, so that a receiver may determine the source of an IP sub-message according to the source ID in the multiplex header of each IP sub-message of the received IP message, thus the receiver can make a safety and reliability check to ensure the reliability and safety of the transmission; a bit indicating the number of bytes in a field is added to the multiplex header, and the field indicates the length of the IP sub-message, thus the indicated length of the IP sub-message can be more than 255 bytes; the CRC check is not performed on the UP data message carried compressed data, thus the network bandwidth and resources of the IP bearer network in the communication system are saved. Therefore, by applying the method and system for transmitting an IP message, the method and system for negotiating a bandwidth saving capability and the method for saving network bandwidth provided by the present disclosure, the network bandwidth and recourses of the IP bearer network is saved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a schematic diagram illustrating the structure of a conventional RTP header of an IP message.

FIG. 4 is a schematic diagram illustrating the structure of a conventional IP message bearing data compressed by an AMR protocol.

FIG. 5a is a schematic diagram illustrating the format of a conventional UP layer date message PDU Type 0.

FIG. 5b is a schematic diagram illustrating the format of a conventional UP layer date message PDU Type 1.

FIG. 14 is a schematic diagram illustrating a format of an UP layer data message in accordance with an embodiment.

FIG. 15 is a schematic diagram illustrating a format of a multiplied IP message in accordance with an embodiment.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 8:
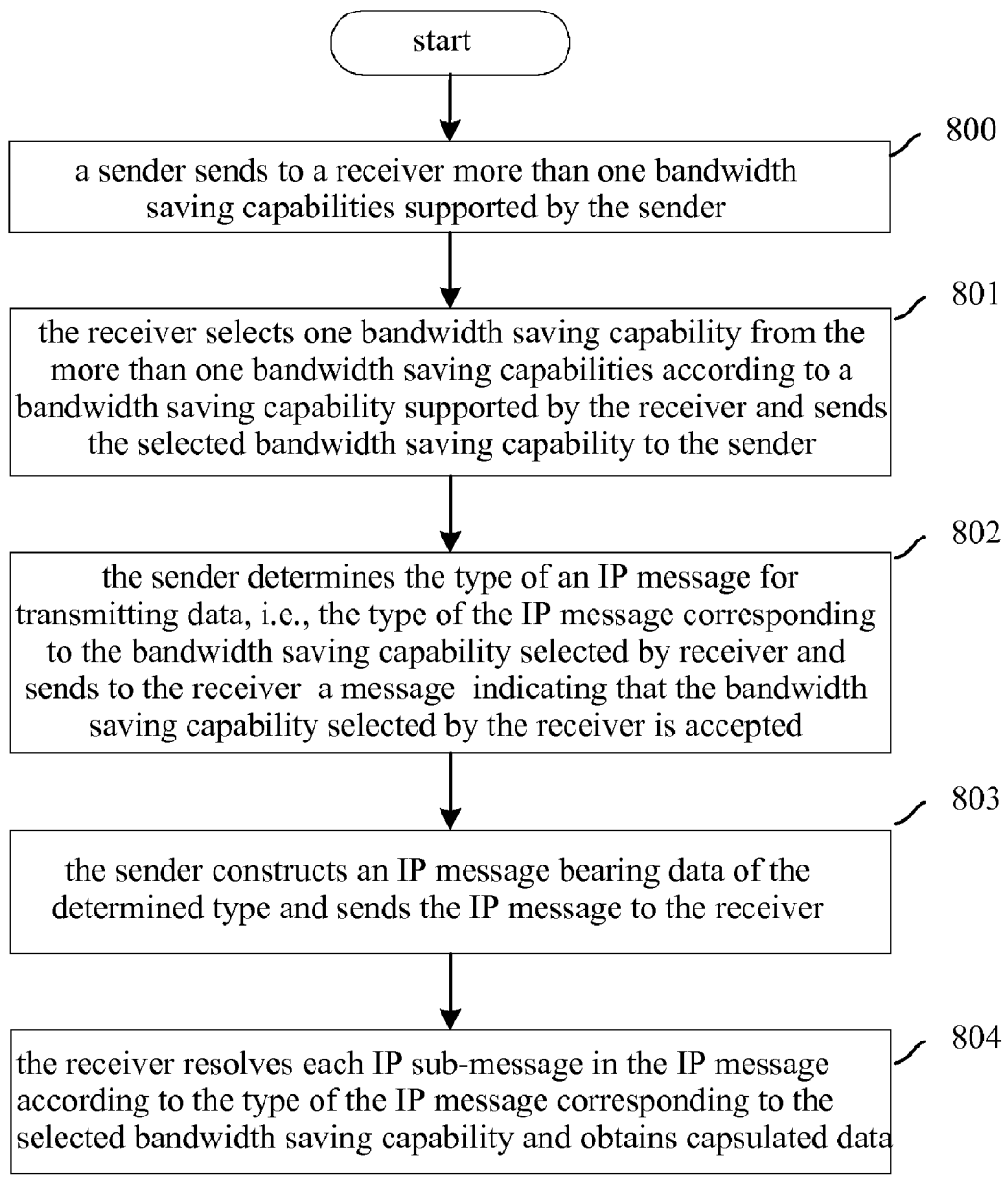
FIG. 8 is a flowchart of a method for transmitting an IP message in accordance with an embodiment.

For the purpose of saving network bandwidth and resources of a communication system, various embodiments provide a method for transmitting an IP message. As shown in FIG. 8, network entities involved in the method include a sender and a receiver of an IP message. The method includes the following process.

The process of negotiating a bandwidth saving capability of an IP message is described as follows.

In block 800, a sender sends to a receiver more than one bandwidth saving capability supported by the sender.

The more than one bandwidth saving capability can be configured as a bandwidth saving capability set.

In block 801, on receipt of the more than one bandwidth saving capability sent by the sender, the receiver selects one bandwidth saving capability from the more than one bandwidth saving capability according to a bandwidth saving capability supported by the receiver, and then the receiver sends to the sender the bandwidth saving capability selected from the more than one bandwidth saving capability.

The receiver may configure a selecting policy of the bandwidth saving capability. When the receiver supports multiple bandwidth saving capabilities in the more than one bandwidth saving capability sent by the sender, the receiver may select the bandwidth saving capability which is supported by the receiver and saving maximum bandwidth (or other predetermined contents), and then the receiver sends the selected bandwidth saving capability to the sender.

In block 802, on receipt of the bandwidth saving capability selected by the receiver, the sender determines a type of the IP message used for transmitting data, and the type of the IP message corresponds to the bandwidth saving capability selected by the receiver; and the sender sends to the receiver a message indicating that the bandwidth saving capability selected by the receiver is accepted.

The process of transmitting the IP message is described as follows.

In block 803, after the type of the IP message used for transmitting data is determined, the sender constructs an IP message bearing data of the determined type and sends the IP message to the receiver.

Figure 1:
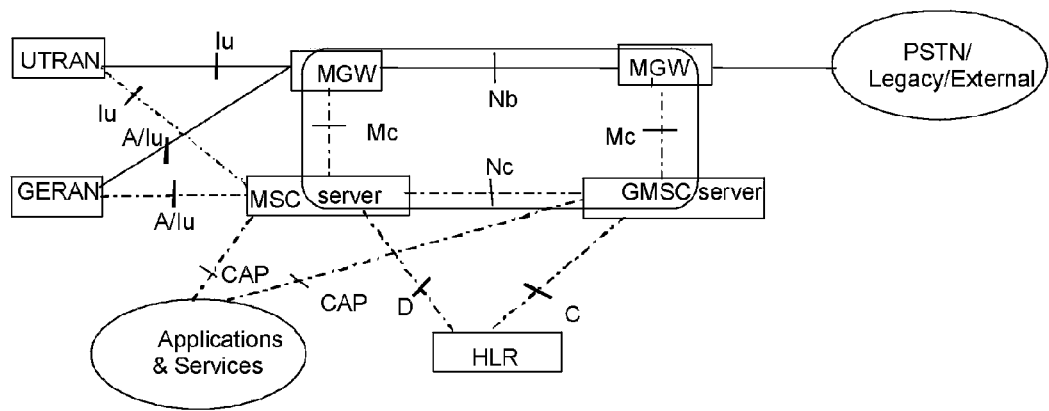
FIG. 1 is a schematic diagram illustrating the structure of a conventional WCDMA network.
Figure 2:
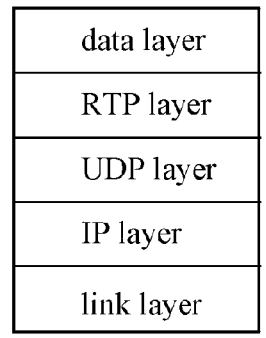
FIG. 2 is a schematic diagram illustrating the structure of a conventional protocol stack bearing an IP message.
Figure 6:
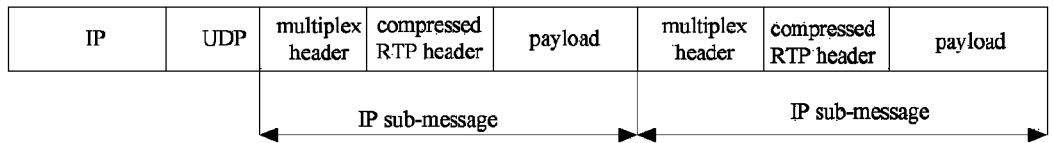
FIG. 6 is a schematic diagram illustrating the structure of a conventional IP message using a multiplex header technique and a RTP technique.
Figure 7:
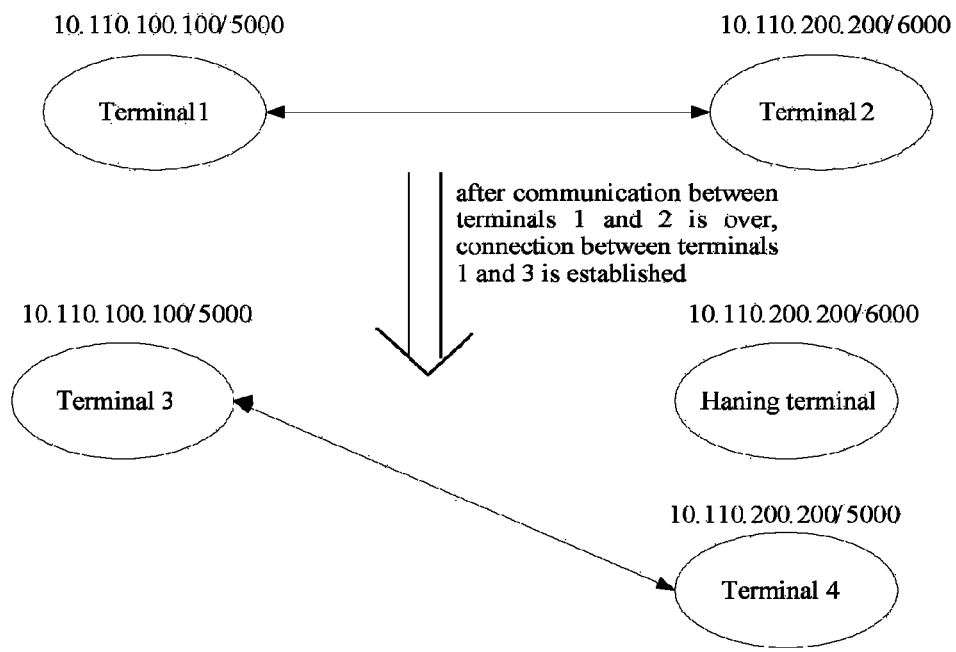
FIG. 7 is a schematic diagram illustrating an embodiment in which the IP message constructed by the conventional multiplex header technique has no reliability.

In the present disclosure, the IP message shown in FIG. 6 may be used for transmitting data, but the following improvements are needed. First, for the purpose of solving the problem of the related art, i.e., the validity of the IP sub-message source in the IP message can not be determined, a source ID indicating the information of the sender is carried in the multiplex header of the IP sub-message in the IP message. The source ID may be the User Datagram Protocol (UDP) port number of the session which the IP sub-message belongs to; or the source ID may be a value obtained by dividing the UDP port number by 2. Thus the receiver may determine the validity according to the source ID indicating the information of the sender carried by the IP sub-message in the IP message. Second, in the prior art, one byte in the multiplex header of the IP sub-message in the IP message is used to indicate the length of the IP sub-message, and the indicated length is less than 255 bytes. In the embodiment, besides 1 byte used in the multiplex header, 2 bytes may be used to indicate the length of the IP sub-message. For the purpose of avoiding a waste in network bandwidth of the communication system, another bit in the multiplex header is used to indicate the number of bytes in a field which indicates the length of the IP sub-message; for example, 0 indicates that 1 byte is used to indicate the length of the IP sub-message, and 1 indicates that 2 bytes are used to indicate the length of the IP sub-message, etc. Third, the embodiment provides a format of the UP data message with compressed data in the UP layer, only the UP header is compressed, and no CRC check is performed on the UP header and compressed data i.e., payload.

In block 804, on receipt of the IP message sent by the sender, the receiver resolves each IP sub-message in the IP message according to the type of IP message corresponding to the selected bandwidth saving capability and thus obtains the encapsulated data.

Detailed processes for negotiating the bandwidth saving capability of the IP message are described below.

Different methods for negotiating a bandwidth saving capability are used when the IP message is transmitted via different interfaces in the communication system. In the embodiment, several negotiation methods are described as follows.

1) When the IP message is transmitted via the Iu interface of a WCDMA system, the UP is used for negotiating the bandwidth saving capability, and multiple bandwidth saving capabilities are carried in UP extended field s, i.e., a bandwidth saving capability set is carried in UP extended fields.

2) When the IP message is transmitted via the Nb interface of the WCDMA system, the IP Bearer Control Protocol IP (IPBCP) and the Session Description Protocol (SDP) are used for negotiating the bandwidth saving capability, and multiple bandwidth saving capabilities are carried in the SDP. The UP may also be used for negotiating the bandwidth saving capability, and multiple bandwidth saving capabilities are carried in the UP extended fields.

3) When the IP message is transmitted between a receiver and a sender in an IMS, the Session initiation protocol (SIP) and the SDP are used for negotiating the bandwidth saving capability, and multiple bandwidth saving capabilities are carried in the SDP. When the IP message is transmitted between a media controlling equipment and a media processing equipment, the H.248 protocol and the SDP are used for negotiating the bandwidth saving capability, and multiple bandwidth saving capabilities are carried in the SDP.

4) When the IP message is transmitted in a fixed softswitch system, the SIP and the SDP are used for negotiating between softswitch devices, and multiple bandwidth saving capabilities are carried in the SDP; the H.248 protocol and the SDP are used for negotiating between the softswitch device and the media gateway, and multiple bandwidth saving capabilities are carried in the SDP.

When the SDP is used for negotiating the bandwidth saving capability of the IP message, a media attribute a=fmtp is defined in the SDP, and the SDP transmits parameters of a certain format by the media attribute and does not concern contents of the parameter. The format of the media attribute a=fmtp is: a=fmtp:<format> <format specific parameters>, and the <format specific parameters> may be any character string complying with specification in the SDP. In the various embodiments, the parameters are used for carrying multiple supported bandwidth saving capabilities; information indicating bandwidth saving capability may be in a variety of modes, and two modes are described below.

In the first mode, all the supported bandwidth saving capabilities are listed in a media attribute, i.e., a=fmt: a=fmtp:<format> IPFmts={x, y, z, ... }, and x, y, z indicate bandwidth saving capabilities in a descending order of priority. For example, a=fmtp: 4 IPFmts={0,1} indicates that the bandwidth saving capabilities as 0 or 1 are supported by an IP message with a payload type of 4.

In the second mode, a supported bandwidth saving capability is listed in each media attribute, i.e., a=fmtp:<format> IPFmts=x; a=fmtp:<format> IPFmts=y; and a=fmtp:<format> IPFmts=z, and the supported bandwidth saving capabilities are listed in a descending order of priority with the leading one being the bandwidth saving capability to be used most desirably.

In the embodiment, a special media attribute a=fmtp is used for indicating that the media controlling device expects the media processing device to provide multiple supported bandwidth saving capabilities, and the media attribute may be expressed as a=fmtp:<format> IPFmts=$.

The method for negotiating the bandwidth saving capability of the IP message by the H.248 protocol and the SDP, using the IPBCP and the SDP, using the SIP and the SDP and using the UP are described below respectively.

The method for negotiating the bandwidth saving capability of the IP message by the H.248 protocol and SDP is described.

In the case of Non-Tunnel in a circuit-switched core network of a WCDMA system or in a fixed softswitch system, the IPBCP can not be used for negotiating the bandwidth saving capability between two media processing devices, and a media controlling device controls the media processing devices for negotiating by the H.248 protocol. During the negotiation, the media controlling device and media processing devices interact by the H.248. The LOCAL and REMOTE descriptors in the H.248 protocol may be used, and multiple bandwidth saving capabilities are described by the SDP. Here, multiple bandwidth saving capabilities are configured as bandwidth saving capability set. When there is no bandwidth saving capability in the SDP description, it is indicated that the bandwidth saving capability is not supported.

Figure 9:
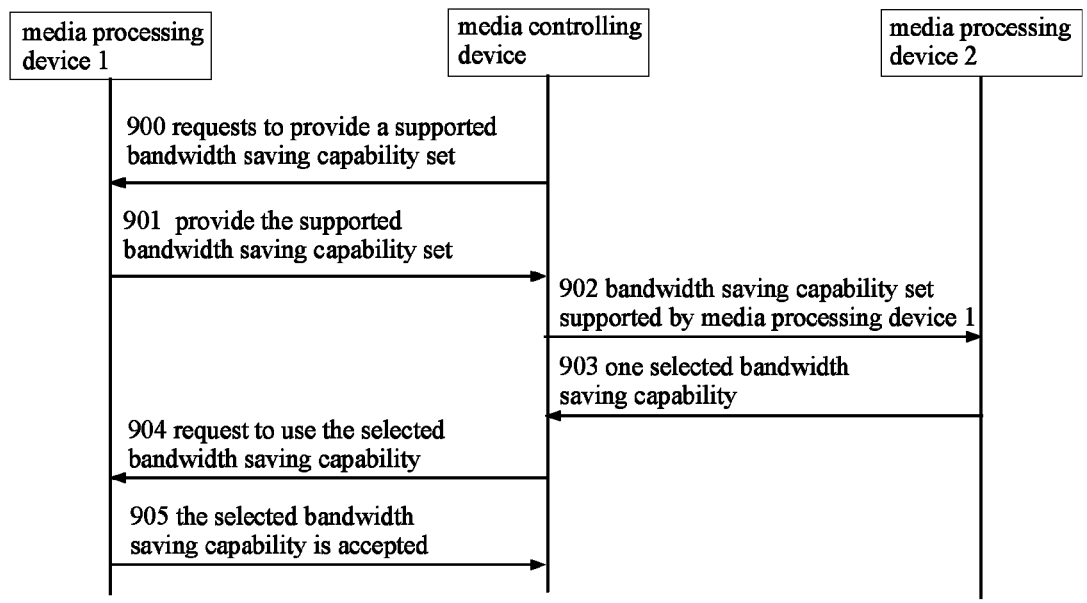
FIG. 9 is a flowchart of a method for negotiating a bandwidth saving capability of an IP message by the H.248 protocol and the SDP in accordance with an embodiment.

FIG. 9 is a flowchart of a method for negotiating an IP message bandwidth saving capability by the H.248 protocol and the SDP in accordance with an embodiment. Network entities involved in the method include a media processing device 1, a media controlling device and a media processing device 2; the media processing device 1 and media processing device 2 may respectively be an IP message sender and an IP message receiver. The method includes the following process.

In block 900, the media controlling device requests the media processing device 1 to provide a supported bandwidth saving capability set.

In block 901, the media processing device 1 sends to the media controlling device the supported bandwidth saving capability set.

In block 902, the media controlling device sends to the media processing device 2 the supported bandwidth saving capability set and requests the media processing device 2 to select a supported bandwidth saving capability.

In block 903, the media processing device 2 selects a supported bandwidth saving capability and returns the selected bandwidth saving capability to the media controlling device.

In block 904, the media controlling device requests the media processing device 1 to use the bandwidth saving capability selected by the media processing device 2.

In block 905, the media processing device 1 returns to the media controlling device a message indicating that the selected bandwidth saving capability is accepted.

The method for negotiating the bandwidth saving capability of the IP message by the H.248 protocol and the SDP is described.

In the case of tunnel in a circuit-switched core network of a WCDMA system, a receiver and a sender exchange negotiation parameters by the IPBCP, and the receiver and the sender may both be media gateways. The negotiation parameters may be a media stream characteristic, an IP address of a media stream carrier and a port number of a media stream carrier. In the embodiment, the SDP is used by the IPBCP to describe a supported bandwidth saving capability set.

Figure 10:
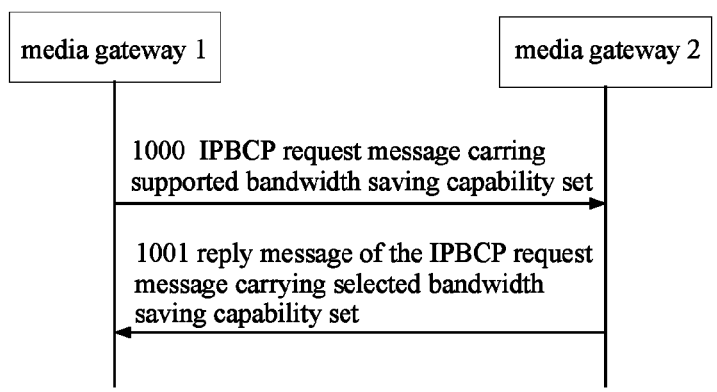
FIG. 10 is a flowchart of a method for negotiating a bandwidth saving capability of an IP message by the IPBCP and the SDP in accordance with an embodiment.

FIG. 10 is a flowchart of a method for negotiating a bandwidth saving capability of an IP message by the IPBCP and the SDP in accordance with an embodiment. Network entities involved in the method include a media gateway 1 and a media gateway 2, and the method includes the following process.

In block 1000, the media gateway 1 sends to the media gateway 2 an IPBCP request message carrying a bandwidth saving capability set supported by the media gateway 1, and the bandwidth saving capability set is described by the SDP.

In block 1001, the media gateway 2 selects a bandwidth saving capability supported by the media gateway 2 from the received bandwidth saving capability set, and the media gateway 2 returns to the media gateway 1 a reply message carrying the selected bandwidth saving capability.

If the media gateway 2 does not support any of the received bandwidth saving capabilities, the SDP description having the bandwidth saving capability set is removed in the reply message.

The method for negotiating the bandwidth saving capability of the IP message by the H.248 protocol and the SDP is described.

The SDP is used by the SIP to describe the supported bandwidth saving capability set.

Figure 11:
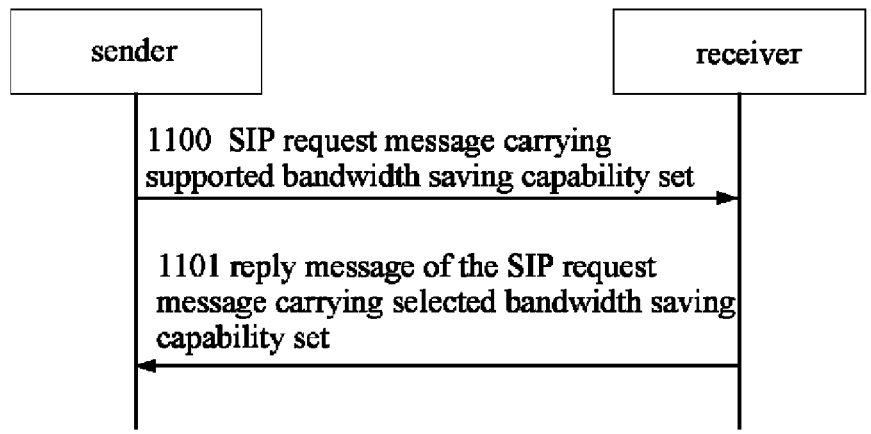
FIG. 11 is a flowchart of a method for negotiating a bandwidth saving capability of an IP message by the SIP and the SDP in accordance with an embodiment.

FIG. 11 is a flowchart of a method for negotiating a bandwidth saving capability of an IP message by the IPBCP and the SDP. Network entities involved in the method include a sender of the IP message and a receiver of the IP message. The method includes the following process.

In block 1100, the sender sends to the receiver a SIP request message carrying the bandwidth saving capability set supported by the sender, and the bandwidth saving capability set is descript by the SDP.

In block 1101, the receiver selects a bandwidth saving capability supported by the receiver from the bandwidth saving capability set and returns to the sender a reply message of the SIP request message carrying the selected bandwidth saving capability.

If the receiver does not support any of the received bandwidth saving capabilities, the SDP description having the bandwidth saving capability set is removed in the reply message.

The method for negotiating the bandwidth saving capability of the IP message by the H.248 protocol and the SDP is described.

In an UP supported mode, an UP initialization message is used for negotiating user plane parameters between the UTRAN and the MGW and between the MGW and the MGW. In the embodiment, an UP initialization request message and a reply message may be used for negotiating the bandwidth saving capability.

Figure 12:
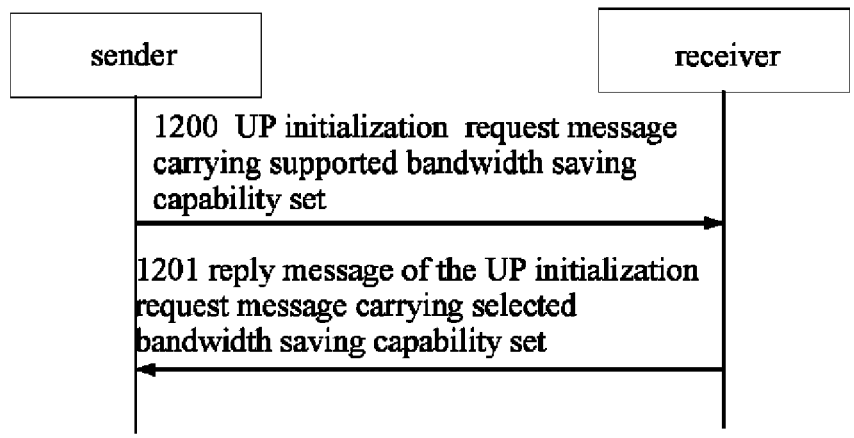
FIG. 12 is a flowchart of a method for negotiating a bandwidth saving capability of an IP message by the UP in accordance with an embodiment.

FIG. 12 is a flowchart of a method for negotiating a bandwidth saving capability of an IP message by the IPBCP and the SDP. Network entities involved in the method include a sender of the IP message and a receiver of the IP message. The method includes the following process.

In block 1200, the sender sends to the receiver an UP initialization request message carrying a supported bandwidth saving capability set.

In block 1201, the receiver selects a bandwidth saving capability supported by the receiver from the bandwidth saving capability set and returns to the sender a reply message of the UP initialization request message carrying the selected bandwidth saving capability.

If the receiver does not support any of the received bandwidth saving capabilities, no bandwidth saving capability is carried in the reply message.

Figure 13:
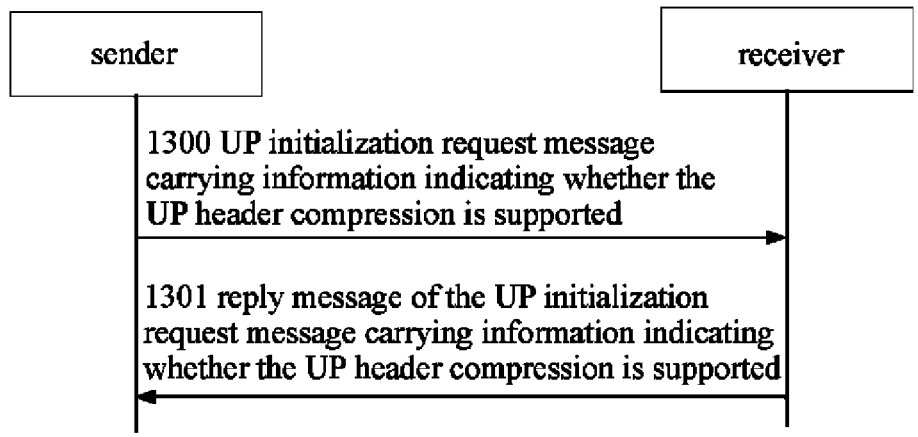
FIG. 13 is a flowchart of a method for negotiating a UP header compression capability by the UP in accordance with an embodiment.

In the embodiment, the UP may also be used for negotiating an UP header compression capability as shown in FIG. 13, and the negotiation includes the following process.

In block 1300, a sender sends to a receiver an UP initialization request message carrying information indicating whether the UP header compression is supported by the sender.

In block 1301, if the receiver supports the UP header compression and the received information from the sender indicating that the sender supports the UP header compression, the receiver sends to the sender a reply message of the UP initialization request message indicating that the UP header compression is supported; if any of the two parties does not support the UP header compression, the receiver returns to the sender the reply message of the UP initialization request message indicating that the UP header compression is not supported.

In the embodiment, several idle extended fields are contained in the UP initialization request message and the reply message, two bitmaps (IPFmts) in an idle extended field in the UP initialization request message may be used for carrying the supported bandwidth saving capability set; one bit, BWS supported, in an idle extended field in the reply message may be used for indicating whether the receiver supports the bandwidth saving capability, and one bit, IPFMT, may be used for indicating the bandwidth saving capability selected by the receiver.

In the embodiment, one bit, UPC, in an idle extended field in the UP initialization request message may be used for indicating whether the sender supports the UP header compression; one bit, UPC, in an idle extended field in the reply message may be used for indicating whether the receiver supports the UP header compression.

With reference to Table 1,

TABLE 1

| Parameter Title | IPFmts | BWS supported | IPFMT | UPC |
|---|---|---|---|---|
| length Indication | 2 bits bandwidth saving capability list | 1 bit whether a bandwidth saving capability is supported | 1 bit the selected bandwidth saving capability which is valid when BWS supported is 1 | 1 bit Whether the UP header compression is supported |
| value | 00: support no bandwidth saving capability 01: support bandwidth saving capability 0 10: support bandwidth saving capability 1 11: support bandwidth saving capability 0, 1 | 0: support no bandwidth saving capability 1: support a bandwidth saving capability | 0: support bandwidth saving capability 0 1: support bandwidth saving capability 1 | 0: support no UP header compression 1: support UP header compression |
| location | UP initialization request message | reply message of the UP initialization request message | reply message of the UP initialization request message | UP initialization request message/ reply message of the UP initialization request message |

It can be seen that, if the sender supports a bandwidth saving capability, the sender assigns the bitmap (IPFmts) fields in the UP initialization request message according to the supported bandwidth saving capability set. The receiver selects one bandwidth saving capability supported by the receiver from the bitmap (IPFmts) fields in the received UP initialization request message, and then the receiver writes the supported bandwidth saving capability in the IP FMT field in the reply message of the UP initialization request message and sets the BWS supported field as 1 at the same time, thus the sender and the receiver may process the IP messages corresponding to the same bandwidth saving capability. If the receiver does not support the bandwidth saving capability, or not support the bandwidth saving capability in the bitmap (IPFmts) field in the received IP initialization request message, the receiver sets the BWS supported field as 0 in the reply message of the UP initialization request message, thus the sender and the receiver can only process ordinary IP messages.

It also can be seen from Table 1 that the sender may indicate in the UP initialization request message that whether the UP header compression is supported, the receiver may indicate in the reply message of the UP initialization request message that whether the UP header compression is supported, and only when the UP header compression is supported by both of the sender and the receiver, the UP header compression function can be used in the IP messages transmitted between the sender and the receiver.

In the embodiment, the UP header compression capability may also be described by the SDP, and the SDP may be used for negotiating the UP header compression capability. For example: a=fmtp:<format> UPC=yes indicates that the UP header compression is supported; a=fmtp:<format> UPC=no indicates that the UP header compression is not supported.

Detailed descriptions of types of the IP message used in the embodiments are described below.

In the embodiment, the link layer, the IP layer and the UDP layer in the protocol stack bearing an IP message are all kept unchanged, multiple IP sub-messages are encapsulated in an IP message, each content of each session is carried in each IP sub-message, and there is a multiplex header in an IP sub-message as shown in FIG. 6.

In the embodiment, an RTP header is compressed. If the sender and the receiver both support the UP header compression, the UP header may also be compressed.

In the embodiment, the IP header format of the IP message is the same as that in the prior art; the UDP header is the same as that in the prior art, i.e., the destination UDP port number is a fixed value, the value of the source UDP port number is meaningless and may be any value; the multiplex header includes a multiplex ID, a source ID, a length indicator bit and a length field. The multiplex ID is the number of the destination UDP port receiving the sub-message or a value obtained by performing some operation of the number of the destination UDP port; the source ID is the number of the source UDP port sending the sub-message or a value obtained by performing some operation of the number of the source UDP port; the length indicator bit indicates the number of the bytes in the length field is 1 or 2 bytes; and the length field indicates the length of the IP sub-message. The compression process of the RTP header is the same as that in the prior art.

In the embodiment, since the CRC check is performed in the link layer and thus the data borne by the IP message is surely correct, no CRC check is needed in the UP layer. Thus an UP header type is defined in the embodiment, and the UP header with the UP header type does not include the CRC check of the UP header and the CRC check of the payload. As shown in FIG. 14, no CRC check is performed in the check part.

Figures 16, 17:
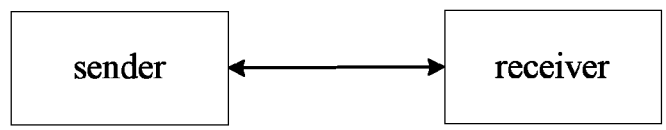
FIG. 16 is a schematic diagram illustrating a format of an IP message with a compressed IP message header after being multiplied in accordance with an embodiment.
FIG. 17 is a schematic diagram illustrating a system for transmitting an IP message in accordance with an embodiment.

If only the message header of the IP message is compressed, the saved bandwidth is not obvious, so the IP message header is usually compressed after being multiplied. Two examples are given below to define two IP message formats: one is that the IP message is only multiplied, the other is that IP message header of the IP message is compressed after being multiplied as shown in FIGS. 15 and 16. In practice, a variety of IP message formats may be provided according to the multiplexing technique and a variety of IP message compression techniques.

In FIG. 15, the IP message is only multiplied; the RTP header is not compressed and is kept unchanged. There is a multiplied header before each multiplied IP sub-message; the contents of the multiplex header include a length field indication (L), a multiplex ID (MUXID), a source ID (SourceID) and a length of the multiplex message (Length). The L indicates the number of bytes in the Length; L=0 indicates the number of the bytes in the Length is one byte, and the indicated length of the IP sub-message is at most 255 bytes; L=1 indicates the number of the bytes in the Length is 2 bytes, and the indicated length of the IP sub-message is at most 65535 bytes. The MUXID may be expressed by the destination UDP port number divided by 2. The SourceID may be expressed by the source UDP port number or the source UDP port number divided by 2; and the receiver may use the SourceID to check the validity of the IP sub-message. As for the Length, the length of the IP sub-message may be indicated by one byte or 2 bytes.

In FIG. 16, the IP message is multiplied, and the RTP header is compressed. There is a multiplied header and a compressed RTP header before each multiplied IP sub-message. The contents of the multiplex header include an L, a MUXID, a SourceID, and a Length; the contents of the compressed RTP header include a P, an M, a Payload Type, a Time Stamp and a Sequence Number. The L indicates the number of bytes in the Length; L=0 indicates that the number of bytes in the Length is one byte, and the indicated length of the IP sub-message is at most 255 bytes; L=1 indicates that the number of bytes in the Length is 2 bytes, and the indicated length of the IP sub-message is at most 65535 bytes. The MUXID may be expressed by the destination UDP port number divided by 2. The SourceID may be expressed by the source UDP port number or the source UDP port number divided by 2, and the receiver may use the SourceID to check the validity of the IP sub-message. As for the Length, the length of the IP sub-message may be indicated by one byte or 2 bytes. The usage of the P is consistent with that in the standard RTP header; if there is an additional padding byte in the IP sub-message, the flag is configured. The usage of the M is consistent with that in the standard RTP header; the meaning of the M is specified by the session, and the M is used for determining borders of different data. The usage of the Payload Type is consistent with that in the standard RTP header. The usage of the Sequence Number is consistent with that in the standard RTP header, and the length of the Sequence Number is 8 bits, which is 16 bits before being compressed. The usage of the Time Stamp is consistent with that in the standard RTP header, and the length of the Time Stamp is 16 bits, which is 32 bits before being compressed. The RTP header may be compressed by a structure as shown in FIG. 6.

In the methods provided by the various embodiments, the IP message is multiplied, the RTP header is compressed and the data borne in the IP message is compressed. Therefore, the efficiency for processing the IP message by processing devices in the communication system is improved. In the various embodiments, a source indication is carried by the multiplex header of each IP sub-message in the IP message, thus the receiver may determine the validity of the IP message, the reliability and safety are improved. In the process of negotiating the bandwidth saving capability, by applying the methods provided by the various embodiments, multiple bandwidth saving capabilities are carried at the same time, the success rate is improved. In the process of negotiating the bandwidth saving capability by applying the methods provided by the various embodiments, the H.248 protocol, the IPBCP and the SIP may be used, thus the negotiation methods can be applied in the case of Non-Tunnel in a circuit-switched core network of the WCDMA system and the fixed softswitch network.

The various embodiments also provide a system for transmitting an IP message as shown in FIG. 17, and the system includes a sender and a receiver.

The sender sends to the receiver more than one bandwidth saving capability supported by the sender, and determines a type of the IP message used for transmitting data according to a received bandwidth saving capability selected by the receiver, and then the sender sends an IP message to the receiver after constructing the IP message bearing data to be transmitted by the determined type of the IP message.

The receiver selects the bandwidth saving capability from the more than one bandwidth saving capability sent by the sender according to a bandwidth saving capability supported by the receiver, and then the receiver sends the selected bandwidth saving capability to the sender.

The sender and receiver also include RTP header compression capability negotiation modules respectively.

The RTP header compression capability negotiation module of the sender sends to the receiver information indicating whether RTP header compression is supported by the sender and receives from the receiver information indicating whether the RTP header compression is supported, and the RTP header compression capability negotiation module of the sender compresses an RTP header when constructing the IP message if the RTP header compression is supported.

The RTP header compression capability negotiation module of the receiver determines whether the RTP header compression is supported according to whether the RTP header compression is supported by the receiver and according to the received information indicating whether the RTP header compression is supported by the sender and sends to the sender the information indicating whether the RTP header compression is supported.

The receiver further includes an IP message reception resolution module. On receipt of the IP message sent by the sender, the IP message reception resolution module resolves each IP sub-message in the IP message according to the type of IP message corresponding to the selected bandwidth saving capability and obtains the transmitted data.

The various embodiments also provide a system for negotiating a bandwidth saving capacity. The system includes a sender and a receiver. The sender sends to the receiver more than one bandwidth saving capability supported by the sender and determines a type of the IP message used for transmitting data according to a received bandwidth saving capability selected by the receiver. The receiver selects the bandwidth saving capability from the more than one bandwidth saving capability sent by the sender according to a bandwidth saving capability supported by the receiver and sends the selected bandwidth saving capability to the sender.

In the various embodiments, the sender further includes an IP message construction module to construct a multiplied IP message bearing the data to be transmitted according to the determined type of the IP message and to send to the receiver the multiplied IP message constructed. At least one IP sub-message having a multiplex header is included in the multiplied IP message. The multiplex header of the IP sub-message includes at least one of a source ID for indicating the information of the sender, an indication for indicating the number of bytes used for indicating the length of the IP sub-message and an indication for indicating the length of the IP sub-message.

In various embodiments, the sender further includes an IP message construction module to construct the IP message bearing the data to be transmitted after the IP message is compressed according to the determined type of the IP message. The IP message includes an UP data message without a CRC check and an UP header without a CRC check. The IP message construction module sends the constructed IP message to the receiver.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for transmitting an Internet Protocol message, comprising:
    sending more than one bandwidth saving capability supported by a sender to a receiver;
    receiving one bandwidth saving capability selected by the receiver;
    obtaining a type of the Internet Protocols (IP) message for transmitting data according to the bandwidth saving capability selected by the receiver; and
    sending the IP message to the receiver after constructing the IP message;
    wherein the one bandwidth saving capability is selected from the more than one bandwidth saving capability and is supported by the receiver, if the receiver supports multiple bandwidth saving capabilities in the more than one bandwidth saving capability sent by the sender, the receiver selects the bandwidth saving capability saving maximum bandwidth,
    wherein the IP message is a multiplied IP message comprising at least one IP sub-message with a multiplex header, wherein the multiplex header of the IP sub-message comprises a source identifier (ID) for indicating information of the sender and a first indication for indicating length of the IP sub-message, and the source ID is a value obtained by dividing a source User Datagram Protocol (UDP) port number of a session which the IP sub-message belongs to by 2.

2. The method of claim 1, wherein the obtaining the type of the IP message further comprises obtaining the type of the IP message according to a preconfigured relationship between bandwidth saving capabilities and types of IP message.

3. The method of claim 1, wherein the one bandwidth saving capability is selected according to a preconfigured policy if the receiver supports multiple bandwidth saving capabilities of the more than one bandwidth saving capability.

4. The method of claim 1, wherein the multiplex header of the IP sub-message further comprising a second indication for indicating number of bytes in the first indication.

5. The method of claim 1, wherein:
    the IP message comprises an User Plane (UP) data message comprising an UP header and data to be transmitted; and
    the UP header and the data to be transmitted are compressed without Cyclic Redundant Coding, check.

6. The method of claim 1, before constructing the IP message, further comprising:
    sending, by the sender, to the receiver information indicating whether Real-Time Transport Protocol, (RTP) header compression is supported by the sender;
    determining, by the receiver, whether the RTP header compression is supported by both the sender and the receiver according to the information indicating whether a RTP header compression is supported by the sender;
    sending, by the receiver, to the sender information indicating that the RTP header compression can be supported if the RTP header compression is supported by both the sender and the receiver;
    sending, by the receiver, to the sender information indicating that the RTP header compression can not be supported if any one of the sender and the receiver does not support the RTP header compression; and
    compressing, by the sender, the RTP header of the IP message if the RTP header compression can be supported.

7. A method for ensuring reliability of message transmission, comprising:
    loading data in an Internet Protocol (IP) message; and
    sending the IP message to a receiver;
    wherein a type of the IP message for transmitting data is according to a bandwidth saving capability selected by the receiver, and the bandwidth saving capability is selected from more than one bandwidth saving capability and is supported by the receiver, if the receiver supports multiple bandwidth saving capabilities in the more than one bandwidth saving capability sent by a sender, the receiver selects the bandwidth saving capability saving maximum bandwidth,
    wherein the IP message comprises at least one IP sub-message which comprises a multiplex header,
    wherein the multiplex header comprises a source identifier (ID) for indicating information of the sender and a first indication for indicating length of the IP sub-message, and the source ID is a value obtained by dividing a source User Datagram Protocol (UDP) port number of a session which the IP sub-message belongs to by 2.

8. The method of claim 7, wherein the multiplex header of the IP sub-message further comprises a second indication for indicating number of bytes in the first indication.

9. The method of claim 7, wherein the IP message comprises an User Plane (UP) data message comprising an UP header and data to be transmitted;
    the UP header and the data to be transmitted are compressed without Cyclic Redundant Coding check.

10. A system for transmitting an Internet Protocol message, comprising:
    a sender, wherein the sender is configured to communicate with a receiver,
    wherein the sender is configured to send to the receiver more than one bandwidth saving capability supported by the sender, obtain a type of the Internet Protocol (IP) message used for transmitting data according to one bandwidth saving capability received from the receiver, and send the IP message of the obtained type to the receiver after constructing the IP message; and wherein the receiver is configured to select the bandwidth saving capability from the more than one bandwidth saving capability, the bandwidth saving capability being supported by the receiver, if the receiver supports multiple bandwidth saving capabilities in the more than one bandwidth saving capability sent by the sender, the receiver selects the bandwidth saving capability saving maximum bandwidth, wherein the sender is further configured to construct a multiplied IP message of the obtained type of the IP message; wherein the multiplied IP message comprises at least one IP sub-message having a multiplex header, and the multiplex header of the IP sub-message comprises a source identifier (ID) for indicating information of the sender and a first indication for indicating length of the IP sub-message, and the source ID is a value obtained by dividing a source User Datagram Protocol (UDP) port number of a session which the IP sub-message belongs to by 2.

11. The system of claim 10, wherein:
the sender is further configured to send to the receiver information indicating whether Real-Time Transport Protocol (RTP) header compression is supported by the sender; receive from the receiver information indicating that the RTP header compression can be supported or information indicating the RTP header compression can not be supported; and compressing the RTP header of the IP message if the RTP header compression can be supported; and
the receiver is further configured to determine whether the RTP header compression is supported by both the sender and the receiver according to the information indicating whether RTP header compression is supported by the sender, and send to the sender the information indicating that the RTP header compression can be supported if the RTP header compression is supported by both the sender and the receiver or the information indicating that the RTP header compression can not be supported if any one of the sender and the receiver does not support the RTP header compression.

12. The system of claim 10, wherein the receiver is further configured to resolve each IP sub-message in the IP message according to the type of the IP message corresponding to the selected bandwidth saving capability and obtain the transmitted data.

13. The system of claim 10, wherein the multiplex header of the IP sub-message further comprises a second indication for indicating number of bytes in the first indication.

14. The system of claim 10, wherein the sender is further configured to construct a compressed IP message of the obtained type, wherein the compressed IP message comprises a User Plane (UP) data message comprising an UP header and data to be transmitted; and the UP header and the data to be transmitted are compressed without Cyclic Redundant Coding check.

15. An apparatus, comprising:
means for sending to a receiver more than one bandwidth saving capability supported by a sender apparatus, receiving one bandwidth saving capability from the receiver;
means for obtaining a type of Internet Protocol (IP) message according to the bandwidth saving capability received from the receiver; and
means for sending the IP message of the obtained type to the receiver after constructing the IP message,
wherein the IP message is a multiplied IP message comprising at least one IP sub-message having a multiplex header, wherein the multiplex header of the IP sub-message comprises a source identifier (ID) for indicating information of the sender and a first indication for indicating length of the IP sub-message, and the source ID is a value obtained by dividing a source User Datagram Protocol (UDP) port number of a session which the IP sub-message belongs to by 2;
wherein if the receiver supports multiple bandwidth saving capabilities in the more than one bandwidth saving capability sent by the sender, the receiver selects the bandwidth saving capability saving maximum bandwidth.

16. The apparatus of claim 15, further comprising:
means for compressing a Real-Time Transport Protocol (RTP) header of the IP message if the RTP header compression can be supported; and
means for sending to the receiver information indicating whether the RTP header compression is supported by the sender, receiving from the receiver information indicating that the RTP header compression can be supported or information indicating that the RTP header compression can not be supported.

17. The apparatus of claim 16, further comprising means for constructing the IP message, wherein the IP message comprises a User Plane (UP) header and data to be transmitted, and the UP header and the data to be transmitted are compressed without Cyclic Redundant Coding check.

18. The apparatus of claim 15, further comprising means for constructing the IP message, wherein the IP message comprises a User Plane (UP) header and data to be transmitted, and the UP header and the data to be transmitted are compressed without Cyclic Redundant Coding check.

* * * * *